US011381641B2

(12) United States Patent
Dhananjay (10) Patent No.: US 11,381,641 B2
(45) Date of Patent: *Jul. 5, 2022

(54) GRANULAR ENTRY SELF-HEALING (71) Applicant: Red Hat, Inc., Raleigh, NC (US)

(72) Inventor: Krutika Dhananjay, Karnataka (IN)

(73) Assignee: Red Hat, Inc., Raleigh, NC (US)

( * ) Notice: Subject to any disclaimer, the term of this patent is extended or adjusted under 35 U.S.C. 154(b) by 100 days.

This patent is subject to a terminal disclaimer.

(21) Appl. No.: 16/680,371

(22) Filed: Nov. 11, 2019

(65) Prior Publication Data
US 2020/0084273 A1 Mar. 12, 2020

Related U.S. Application Data (63) Continuation of application No. 15/054,668, filed on Feb. 26, 2016, now Pat. No. 10,476,957.

(51) Int. Cl.
*H04L 29/08* (2006.01)
*G06F 11/14* (2006.01)
(Continued)

(52) U.S. Cl.
CPC ...... *H04L 67/1097* (2013.01); *G06F 11/1471* (2013.01); *G06F 16/184* (2019.01);
(Continued)

(58) Field of Classification Search
CPC . H04L 67/1097; H04L 67/1095; H04L 67/42; G06F 16/184; G06F 16/11; G06F 11/1471; G06F 11/1402
See application file for complete search history.

(56) References Cited

U.S. PATENT DOCUMENTS 7,653,668 B1 * 1/2010 Shelat .................. G06F 16/184
707/610
7,720,801 B2 * 5/2010 Chen .................. G06F 16/1844
707/613
(Continued)

OTHER PUBLICATIONS

K. Shvachko, H. Kuang, S. Radia and R. Chansler, "The Hadoop Distributed File System," 2010 IEEE 26th Symposium on Mass Storage Systems and Technologies (MSST), 2010, pp. 1-10, doi: 10.1109/MSST.2010.5496972. (Year: 2010).*

(Continued)

*Primary Examiner* — Dennis Truong
(74) *Attorney, Agent, or Firm* — Lowenstein Sandler LLP (57) ABSTRACT A processing device of a client of a distributed file system receives a file operation request, requests creation of a plurality of entries, wherein each entry of the plurality of entries is created in a corresponding file index in each of a set of servers in the DFS, the plurality of entries corresponding to replicas of directories and one or more files that are a subject of the file operation, each entry of the plurality of entries having a unique identifier, and requests performance of the file operation by each server in the set of servers of the DFS. The processing device further receives zero or more confirmations from the set of servers, each received confirmation corresponding to an indication that the file operation was completed by a corresponding server in the set of servers. Responsive to each of the zero or more confirmations, the processing device sends a request to a respective server to clear a respective entry from the file index corresponding to a respective confirmation. Responsive to a reboot of a first server in the set of servers, a processing device of the first server to automatically process the file index on that server by performing a corresponding file operation for each entry in the file index, wherein performing the corresponding file operation includes requesting a (Continued)

copy of a file indicated by each entry from a replica in the set of servers.

20 Claims, 6 Drawing Sheets

(51) Int. Cl.
G06F 16/182 (2019.01)
H04L 29/06 (2006.01)
G06F 16/11 (2019.01)
H04L 67/1097 (2022.01)
H04L 67/1095 (2022.01)
H04L 67/01 (2022.01)

(52) U.S. Cl.
CPC ......... *H04L 67/1095* (2013.01); *H04L 67/42* (2013.01); *G06F 11/1402* (2013.01); *G06F 16/11* (2019.01)

(56) References Cited

U.S. PATENT DOCUMENTS

| | | | |
|---|---|---|---|
| 7,752,402 B2 | 7/2010 | Fachan et al. | |
| 7,801,867 B2* | 9/2010 | Mittal | G06F 11/1451 707/686 |
| 8,818,951 B1* | 8/2014 | Muntz | G06F 16/13 707/639 |
| 8,874,626 B2 | 10/2014 | Avati et al. | |
| 8,904,229 B1* | 12/2014 | Veeraswamy | G06F 11/141 714/6.2 |
| 9,152,686 B2 | 10/2015 | Whitehead et al. | |
| 9,189,495 B1 | 11/2015 | Hughes et al. | |
| 2003/0061537 A1* | 3/2003 | Cha | G06F 11/2094 714/16 |
| 2004/0153479 A1* | 8/2004 | Mikesell | G06F 11/1096 |
| 2005/0289414 A1* | 12/2005 | Adya | G06F 11/1441 714/724 |
| 2007/0220328 A1* | 9/2007 | Liu | G06F 11/1435 714/24 |
| 2009/0271412 A1* | 10/2009 | Lacapra | G06F 3/067 |
| 2011/0153570 A1 | 6/2011 | Kim | |
| 2011/0161335 A1* | 6/2011 | Dash | G06F 16/182 707/758 |
| 2011/0264635 A1* | 10/2011 | Yang | G06F 11/1402 707/695 |
| 2012/0185437 A1* | 7/2012 | Pavlov | G06F 16/182 707/652 |
| 2014/0052705 A1* | 2/2014 | Karampuri | G06F 16/182 707/697 |
| 2014/0074798 A1* | 3/2014 | Karampuri | G06F 16/11 707/689 |
| 2014/0074799 A1 | 3/2014 | Karampuri et al. | |
| 2014/0091086 A1 | 4/2014 | Sorensen et al. | |
| 2014/0222878 A1* | 8/2014 | Avati | G06F 16/182 707/827 |
| 2015/0248434 A1 | 9/2015 | Avati et al. | |
| 2017/0091086 A1* | 3/2017 | Davis | G06F 16/11 |
| 2017/0091235 A1* | 3/2017 | Yammine | G06F 16/1865 |

OTHER PUBLICATIONS

Fra, Miguel, "Installing and Configuring DFS and File Replication in Windows Server 2012", http://www.falconitservices.com/support/KB/Lists/Posts/Post.aspx?ID=170, Jul. 17, 2013, 5 pages.

Globalscape.com; "Using Microsoft DFS for Failover", http://help.globalscape.com/help/wafs4/using_microsoft_dfs_for_failover.htm, Sep. 29, 2014; 6 pages.

EMC Corporation, "High Availability and Data Protection with EMC Isilon Scale-Out NAS," White Paper, Jun. 2015, 37 pages.

* cited by examiner

GRANULAR ENTRY SELF-HEALING

RELATED APPLICATION

This application is a continuation of U.S. patent application Ser. No. 15/054,668, filed Feb. 26, 2016, now U.S. Pat. No. 10,476,957, issued Nov. 12, 2019, which is hereby incorporated by reference in its entirety.

TECHNICAL FILED

The present disclosure relates to a distributed file system, and more particularly, to a granular entry self-healing of files on distributed file systems.

BACKGROUND

Data may be stored as unstructured data, for example, in files and directories in a file system. A distributed file system may store multiple copies ("replicas") of a data file and/or directory on more than one storage server machine to help ensure that, in case of a failure such as hardware failure and/or system failure, the data in the file and/or directory will still be accessible. If a storage server experiences a failure, the storage server may be unavailable, but changes can still be made to the replicas on the available storage server. The replica on the storage server that is offline may be in an outdated state, such that an operation (e.g., modify, create, or delete) on a replica stored on the storage server was not performed and the storage server no longer has a current version of the data file.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide an understanding of several implementations. At least some implementations, however, may be practiced without these specific details. In other instances, certain components or methods are not described in detail or are presented in simple block diagram format in order to avoid unnecessarily obscuring the specific details. Thus, the specific details set forth are merely examples. Particular implementations may vary from these example details and still be contemplated to be within the scope of the present disclosure.

Implementations are described for granular entry self-healing in a distributed file system. According to automatic file replication (AFR), a distributed file system may include several storage server machines, each storing replicas of a directory X. For example, server A may store a first replica of directory X, server B may store a second replica of directory X and server C may store a third replica of directory X. In one example, server A may go down for a period of time, during which it is unable to store changes to the first replica of directory X or to the files within the first replica of directory X. This downtime may be caused by a temporary network disconnection, if the server is rebooted or if the server suffers some type of operating error. After the period of time, server A may be powered back up or otherwise reinstated into service, and the changes which were made to the second replica of directory X on server B should be propagated to the first replica of directory X on server A. Similarly, the changes which were made to the third replica of directory X on server C should also be propagated to the first replica of directory X on server A. In one implementation, the replica on the failed storage server machine can be referred to as a target replica, and an up-to-date replica used for propagating changes can be referred to as a source replica. Since the target replica is out-of-date, it may not be used as a source replica to update any other replica. In conventional systems, the entire directories may be scanned and compared to one another, in order to identify files that were created, files that were modified, or files that were deleted, while server A was down. Since these directories can include potentially millions of file entries, the comparison can be a time consuming and resource intensive process.

In one implementation, incremental lists or indices can be used to promote granular entry self-healing in the distributed file system. In one implementation, if server A goes down and is unable to store changes to the first replica of directory X, an incremental list or index can be used to determine that directory X was modified and modify the first replica of directory X when server A comes back up. In particular, when server A goes down, server B is notified and starts recording directory names of new and/or modified directories (i.e., directories in which the underlying files have been modified) in the incremental list. In one implementation, the incremental list is a shadow directory containing links to new and modified directories and indicates which specific files or sub-directories within those directories were added or modified. When server A comes back up, the incremental list can be scanned to determine which directories had files that were created, modified or deleted while server A was down, and add, modify or delete the files in the corresponding replica directories on server A using the links in the incremental list. In one implementation, when server B is notified that server A is back up, server B scans the incremental list and sends a new and/or modified directory to server A using the links in the incremental list.

Granular entry self-healing records more fine-grained information about exactly which files were created, deleted or modified while a server was out of service. The incremental list or index records exactly the directories, or the individual files within a directory, that were created, modified or deleted while at least one server (e.g., server A) was out of service. As a result, in an attempt to heal server A, the server need not crawl each directory end-to-end, compare each file on server A and server B and then create, delete or modify the files based on whether the source still contains a particular file or not. In certain implementations, where a given directory contains a large number of files, such as millions of files or more, and only a very small number of those files were created, modified or deleted while server A was down, the use of the index prevents the server from having to compare each of the million files in each directory replica in order to identify the one or two files that were modified.

In one implementation, a background application process known as a daemon running on server A detects when server A reboots or otherwise comes back online after being down for some period of time. In response to this detecting, the daemon initiates a proactive self-healing process. This proactive self-healing process propagates changes to the replica directories on the failed storage server using the incremental list as described above.

In one implementation, when a client machine seeks to perform an operation on a file in a directory managed by a distributed file system, a five phase process is performed. First, the file or directory is locked. The replica of the directory on each of the servers is locked so that other clients cannot access or make changes to the directory or the files within the directory while the current client is performing the current operation. Next, in a pre-operation phase, the client marks the file or directory on which the operation will be performed. For example, the client may add an entry indicating each replica of the directory, as well as the specific file within the directory to be modified, to the incremental list or index. The directory and file may each be identified using a unique identifier. In one implementation, the index is maintained by one of the servers (e.g., server B) but is controlled by commands from the client device. In a third phase, the operation may be performed. As indicated above, the operation may include an add, delete or modify operation to the locked file or directory. In a post-operation stage, the client verifies that the operation was successfully performed on each of replica of the directory on the various servers. In one implementation, the client receives a confirmation message from each server indicating that the operation was successfully performed on the corresponding replica of the directory. In response to receiving the confirmation message, the client may clear the corresponding entry from the incremental list. If a confirmation message is not received from a particular server, the corresponding entry for that replica of the directory is not removed from the incremental list. In a fifth and final stage, the directory is unlocked so that other clients can again access the directory. Thus, at the end of the process, the entries in the incremental list correspond to directory replicas where the most recent changes were not successfully performed.

In one implementation, as part of the proactive self-healing process, the daemon on the server that did not go offline (i.e., server B) sends a message to the other servers in the distributed file system (i.e., server A and server C) to indicate that the incremental list maintained on server B includes at least one entry. If the incremental list includes an entry, server A can request a copy of files under the replica of the directory that were changed (e.g., directory X). When server A receives the copy, server A can overwrite the files in its replica of directory X or can perform an incremental update to directory X, so that the replicas of directory X are consistent across each of servers A, B and C. Once, the second replica of directory X on server A has been updated, the corresponding entry can be removed from the incremental list. This prevents the servers from having to scan the entire directory and compare the files one-by-one to determine that were created, modified, or deleted, while server A was down.

Figure 1A:
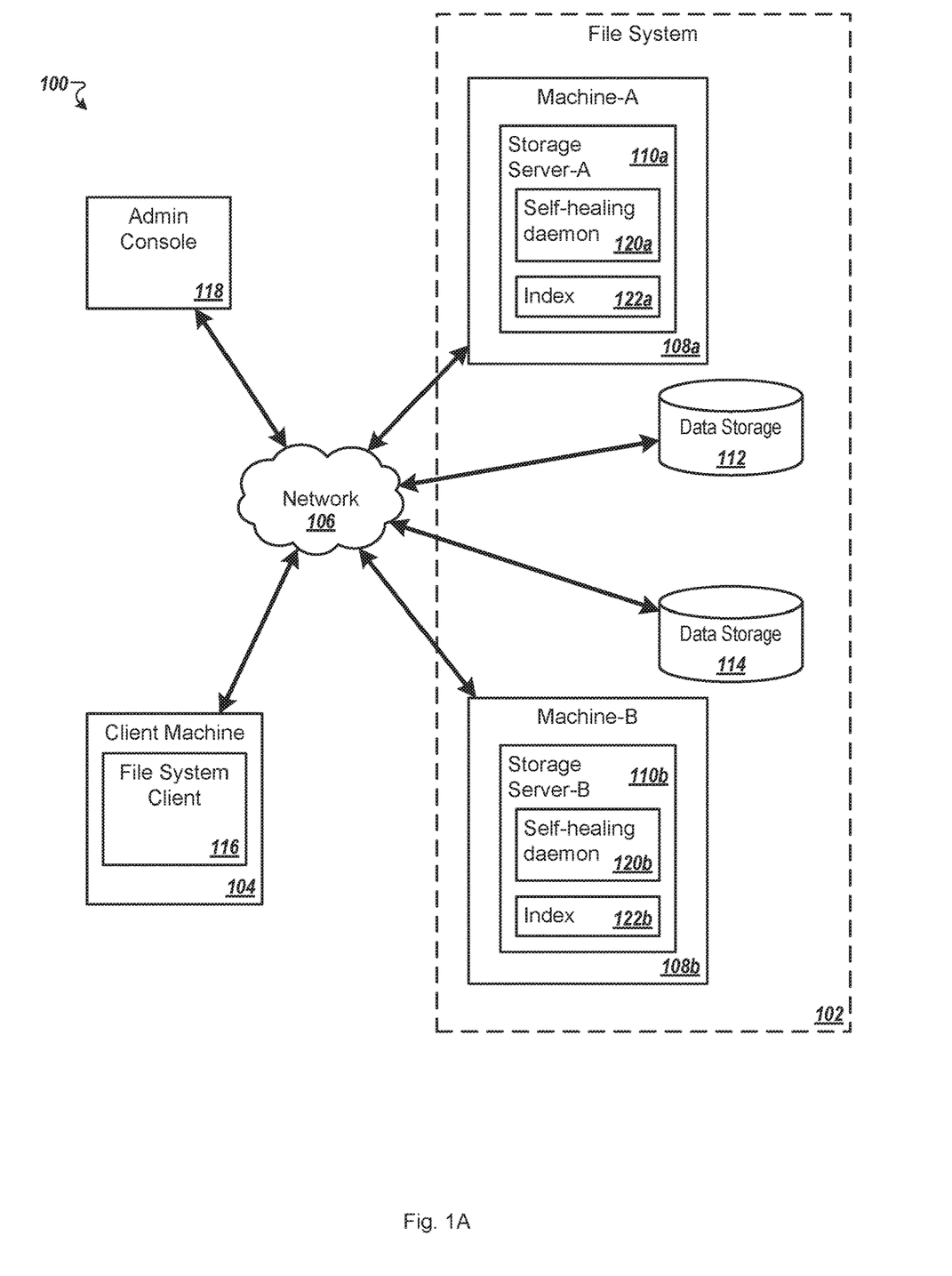
FIG. 1A is a block diagram illustrating an example system architecture for various implementations.

FIG. 1A is a block diagram illustrating an example system architecture for various implementations. The system architecture 100 can include a distributed file system 102 coupled to one or more client machines 104 via a network 106. The network 106 may be a public network, a private network, or any type of data network that connects multiple computing devices, such as for example, a local area network (LAN), a wide area network (WAN), a global area network (GAN) such as the Internet, or a combination of such networks. The distributed file system 102 can be a network attached storage file system that includes one or more machines 108a-b and one or more mass storage devices, such as magnetic or optical storage based disks 112, 114, solid-state drives (SSDs), or hard drives, coupled to the machines 108a-b via the network 106. The machines 108a-b can include, and are not limited to, any data processing device, such as a desktop computer, a laptop computer, a mainframe computer, a personal digital assistant, a server computer, a hand-held device or any other device that processes data. Client machine 104 and any of machines 108a-b may include, for example, computer system 500 of FIG. 5.

The distributed file system 102 can store data as files and can include directories, which are virtual containers within the file system 102, in which groups of files and possibly other directories can be kept and organized. The machines 108a-b can include storage servers 110a-b to manage the files and directories in the data stores 112, 114 for a corresponding storage server 110a-b. The data stores 112, 114 can be one or more persistent storage units. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A "set," as used herein, refers to any positive whole number of items.

Each of the one or more client machines 104 can include a file system client 116 to communicate with the storage servers 110a-b in the file system 102. Examples of file system client 116 can include, and are not limited to, native file system clients and network file system (NFS) clients. "Native" can describe support for specific operating systems. For example, a native file system client may be, and is not limited to, a file system client that supports the Linux operating system. The file system client 116 can mount the file system 102 via a mount point to access the data in the file system 102.

When the file system client 116 requests a file or directory from the file system 102, the file system client 116 may be directed to a specific copy (i.e., replica) of that directory on one of the storage servers 110a-b, and can check and can record an indication of the replica and the underlying file in the corresponding incremental list or index 122a-b. The index 122a-b may be a shadow directory containing links to new and modified files in the corresponding storage server 110a-b. When a certain file in a directory replica is added, modified or deleted, file system client 116 creates a corresponding entry in the index 122a-b. File system client 116 can clear the entry when confirmation that the corresponding operation was successfully performed is received. If the operation is unsuccessful, for example because the storage server maintaining a given replica was out of service at the time the operation was requested, the entry remains in the index 122a-b so that the self-healing daemon on the corresponding storage server can determine which directories need to be updated (i.e., those remaining in the index.) Additional details of this granular entry self-healing process are described below with respect to FIGS. 1B-4.

Figure 1B:
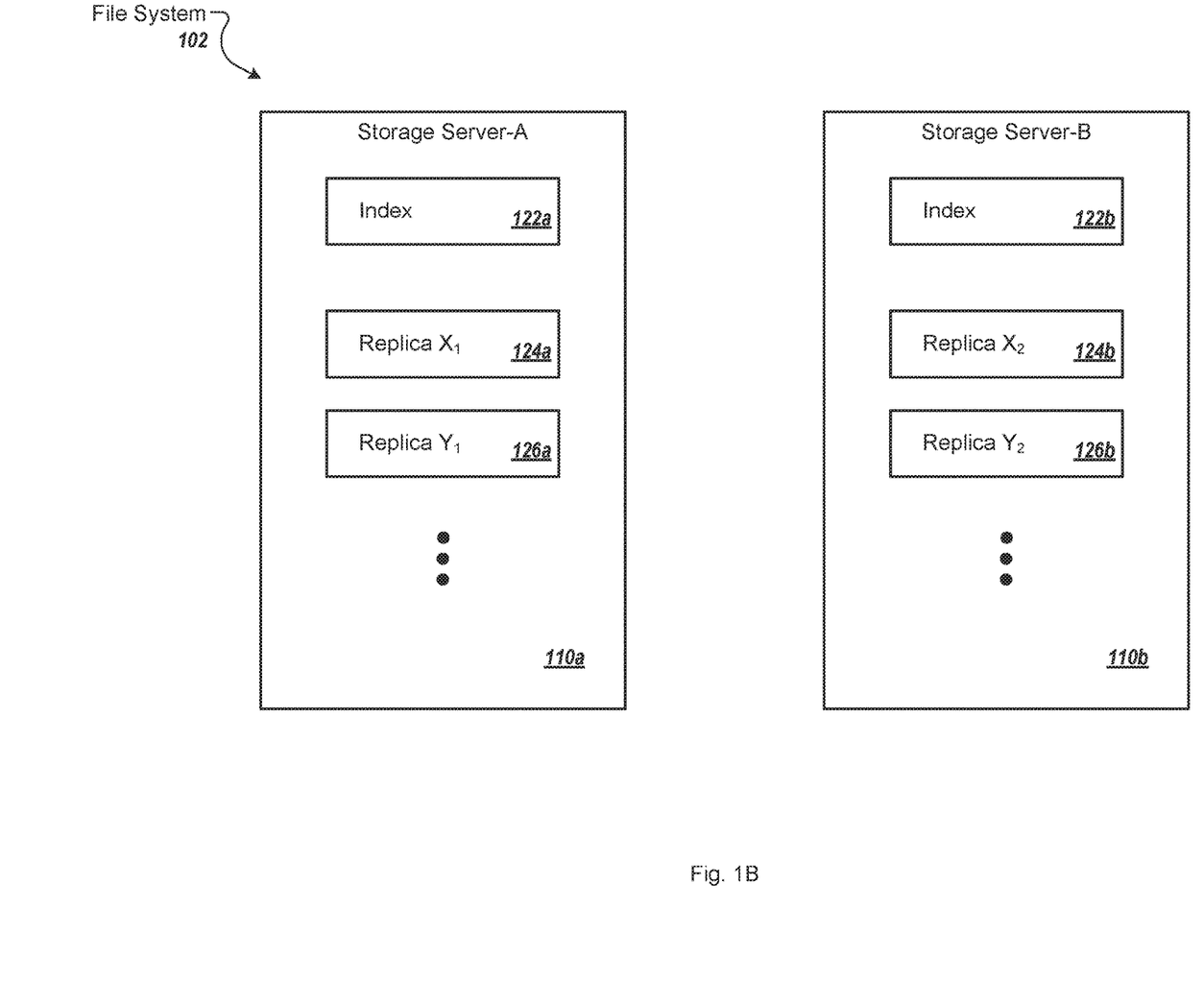
FIG. 1B is a block diagram illustrating a distributed file system for granular entry self-healing.

FIG. 1B is a block diagram illustrating a distributed file system for granular entry self-healing. As described above, the distributed file system 102 may include several servers 110a-b storing replicas of directory X (e.g., a directory including virtual machine image files). For example, server A 110a may store replica $X_1$ 124a of directory X and replica $Y_1$ 126a of directory Y and server B 110b may store replica $X_2$ 124b of directory X and replica $Y_2$ 126b of directory Y. Although only two servers 110a-b are shown in the present example of file system 102, in other implementations file system 102 may include additional servers embodied on different physical machines, where each additional server also stores a corresponding replica of directory X and directory Y. In addition, each of the servers 110a-b in file system 102 may also store replicas of additional directories besides directory X and directory Y.

If, for example, server A 110a goes down and is rebooted or powered back up after being out of service for a period of time, any changes which were made to files in replica $X_2$ 124b on server B 110b while server A 110a was down as a result of a operation requested for directory X by file system client 116 should be propagated to replica $X_1$ 124a on server A 110a. Further, replica $X_1$ 124a on server A 110a should not be used to repair any of the other replicas since it is out-of-date.

During a process to repair or heal replica $X_1$ 124$_a$ on server A 110a, server A 110a can utilize file index 122b on server B 110b to determine which particular files and directories are to be updated. For example, when self-healing daemon 120b on server B 110b detects that server A 110a has rebooted after being out of service for a period of time, self-healing daemon 120b can send a message to server A 110a to indicate that file index 122b stored on server B 110b comprises at least one entry corresponding to replicas of a directory (e.g., directory X, directory Y, etc.) in the distributed file system. As will be described further below, file index 122b includes entries corresponding to replicas of directories where the underlying files have been modified in some fashion. The entries in the index further indicate which specific underlying files have been modified so that the server can quickly and easily determine which files need to be updated without having to scan and compare the entire directory. The entries are generally removed from file index 122b when the operation was successfully performed on the corresponding directory replicas. Thus, a presence of a first entry corresponding to replica $X_1$ 124a in the file index 122b indicates that at least one other replica (e.g., replica $X_2$ 124b) of the directory X was modified according to an operation requested by a client device 104 during the period of time when server A 110a was out of service, and thus replica $X_1$ was not able to be modified according to the operation.

Responsive to receiving an indication that file index 122b comprises a first entry corresponding to replica $X_1$ 124a stored on server A 110a, self-healing daemon 120a can request a copy of replica $X_2$ 124b stored on server B 110b, receive the copy of replica $X_2$ 124b and modify replica $X_1$ 124a in view of replica $X_2$ 124b so that replica $X_1$ 124a matches replica $X_2$ 124b after the operation was performed on replica $X_2$ 124b. As a result, each replica of directory X will be consistent across all servers 110a-b in the file system 102. Since each server in file system 102 maintains a replica of each directory as well as a copy of the file index, any server in file system 102 can be used to heal any other server in the file system. For example, if server B 110b were to go down, server B could use file index 122a to heal any of its directory replicas in the same manner as described above.

Figure 2:
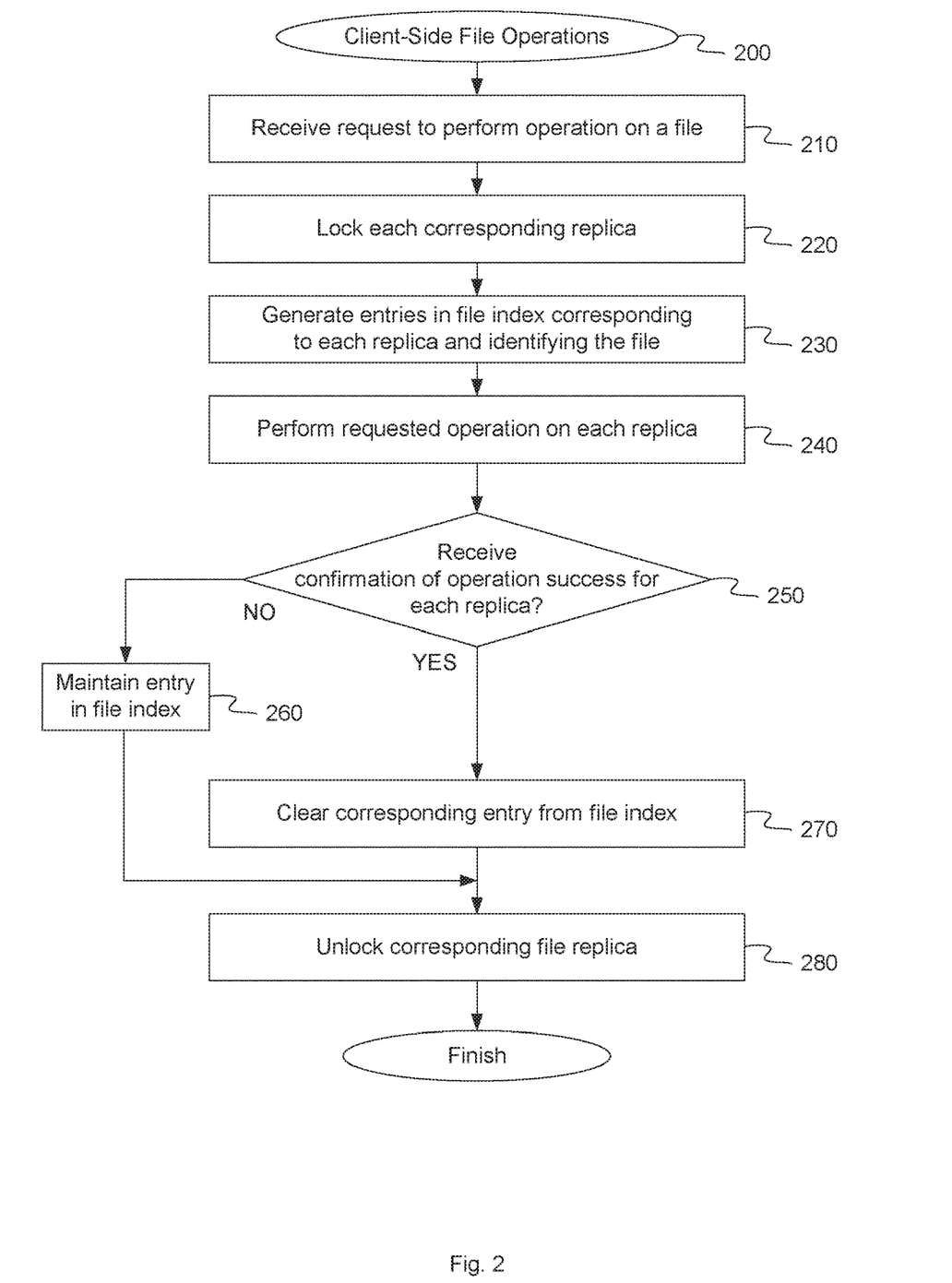
FIG. 2 is a flow diagram illustrating a method for performing client-side file operations in a distributed file system.

FIG. 2 is a flow diagram illustrating a method for performing client-side file operations in a distributed file system. The method 200 may be performed by processing logic that comprises hardware (e.g., circuitry, dedicated logic, programmable logic, microcode, etc.), software (e.g., instructions run on a processing device to perform hardware simulation), firmware, or a combination thereof. The method 200 can perform operations on files in a distributed file system in a manner to enable granular entry self-healing in the event of one of the distributed servers being down for a period of time when the operations are performed. In one example, method 200 may be performed by file system client 116, as shown in FIG. 1A.

Referring to FIG. 2, at block 210, method 200 receives a request to perform an operation on a file in a distributed file system. The distributed file system comprises a first replica 124a stored on a first server 110a and a second replica 124b stored on a second server 110b, wherein the first replica 124a and the second replica 124b are both replicas of the same directory (i.e., directory X) including the file. The request to perform an operation on a file may include at least one of a request to modify the file, a request to delete the file or a request to create the file if it does not already exist. Furthermore, the request may be to add, modify or remove the entire directory. The request may be received from a user of client machine 104, from admin console 118 or from some other source.

At block 220, method 200 locks the first replica 124a and the second replica 124b to prevent other operations from modifying the first replica and the second replica while the requested operation is being performed. When a directory is locked, a lock bit is set, which indicates that any process attempting to access the directory should wait until the lock bit is no longer set. Once the lock is removed, the next process can acquire its own lock and perform any corresponding operations.

At block 230, method 200 generates a first entry and a second entry in a file index 122b, the first entry corresponding to the first replica and the second entry corresponding to the second replica. File system client 116 creates an entry for each replica on which the operation is to be attempted. The entries are added to the index 122a-b on each server 110a-b in the file system 102. In one implementation, each entry identifies the corresponding directory replica, as well as the particular file within that directory that was added, modified or deleted. If one or more of the servers 110a-b are out of service, a corresponding entry may not be added to the index on that server. In the created entries, the first replica 124a is identified in the first entry by a first unique identifier and wherein the second replica 124b is identified in the second entry by a second unique identifier. The identifier may be a name of the directory replica, an assigned alphanumeric identifier, a universal unique identifier (UUID) or some other unique identifier.

At block 240, method 200 performs the requested operation on the first replica 124a and on the second replica 124b. For example, file system client 116 may direct each server 110a-b to perform the read, write, delete, etc. command on a file in the replicas 124a-b. If, for example, one or more of the servers (e.g., server A 110a) is out of service, the operation may not be able to be performed on the replica $X_1$ 124a of directory X that is maintained on server A 110a.

At block 250, method 200 determines whether a confirmation that the requested operation was successfully performed on each of the replicas was received. In response to requesting the operation be performed on each replica of directory X, file system client 116 may receive a confirmation from each server 110a-b indicating whether or not the operation was successfully performed on the corresponding replica of directory X that is maintained by that server. For example, file system client 116 may receive a confirmation that the operation was successfully performed on the second replica 124b since server B 110b is operational at the time of the request, but may not receive a confirmation that the operation was successfully performed on the first replica 124a since server A 110a is out of service at the time of the operation request.

At block 260, method 200 maintains the first entry in the file index 122b responsive to not receiving a confirmation that the operation was successfully performed on the first replica 124a. In one implementation, there is a time interval during which a confirmation is expected. If this time interval expires and the confirmation is not received, method 200 refrains from clearing the first entry from the file index 122b. Thus, the presence of the first entry in the file index indicates that at least one other replica (e.g., replica $X_2$ 124b) of the same directory was modified according to an operation requested by a client device during the period of time when the first server 110a was out of service. From block 260, method 200 proceeds to block 280, as described below.

If at block 250, method 200 receives a confirmation that the requested operation was successfully performed on the first and second replica, method 200 proceeds to block 270 where method 200 removes the second entry from the file index 122a. In one implementation, method 200 may also remove the second entry from file index 122b when the operation succeeded on both replicas. Since the file index 122b includes entries corresponding to replicas that are currently being operated on or for which an operation was not able to be successfully performed, once the first replica 124a is modified to reflect the changes that result from performing the operation, the corresponding entry can be removed from index 122b.

At block 280, method 200 unlocks the first replica responsive to receiving the indication that the first replica was modified in view of the second replica and unlocks the second replica responsive to receiving the confirmation that the operation was successfully performed on the second replica. In addition, method 200 may unlock the first replica once a corresponding entry has been created and maintained in index 122b. This allows other processes to access the directory replicas and perform additional operations.

Figure 3:
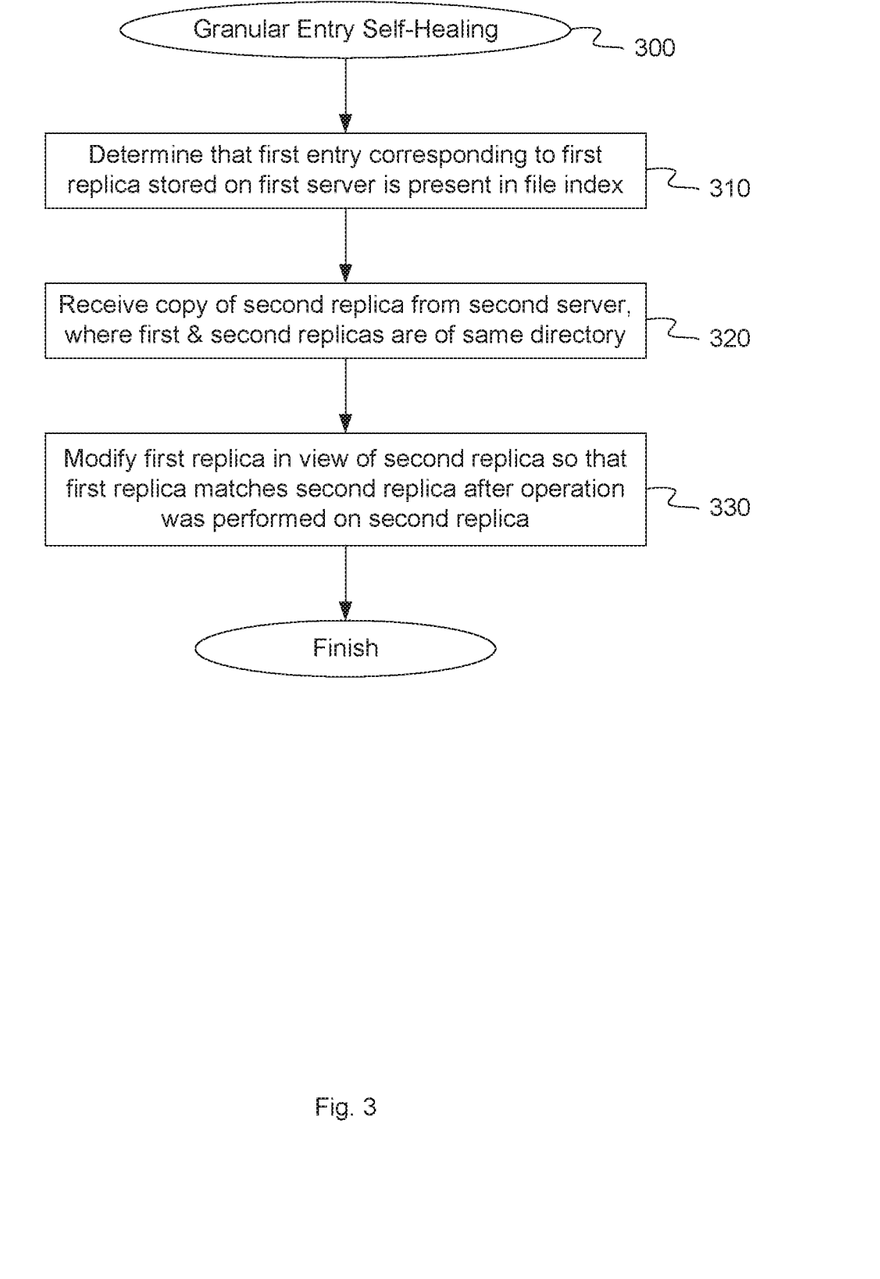
FIG. 3 is a flow diagram illustrating a method for granular entry self-healing in a distributed file system.

FIG. 3 is a flow diagram illustrating a method for granular entry self-healing in a distributed file system. The method 300 may be performed by processing logic that comprises hardware (e.g., circuitry, dedicated logic, programmable logic, microcode, etc.), software (e.g., instructions run on a processing device to perform hardware simulation), firmware, or a combination thereof. The method 300 can restore a directory replica on a storage server which was out of service for a period of time and did not receive updates to the files in a given directory performed during that period of time. In one example, method 300 may be performed by self-healing daemon 120a-b, as shown in FIG. 1A.

Referring to FIG. 3, at block 310, method 300 determines that a first entry corresponding to a first replica 124a stored on a first server 110a is present in a file index 122b. The presence of the first entry in the file index 122b indicates that at least one other replica 124b of the same directory was modified according to an operation requested by a client device 104 during a period of time when the first server 110a was out of service. Upon rebooting, a self-healing daemon 120a on the first server 110a may receive a message from a second server 110b indicating that the file index 122b maintained by the second server 110b comprises at least one entry corresponding to replicas of the same directory.

At block 320, method 300 receives a copy of a second replica 124b stored on a second server 110b, wherein the first replica 124a and the second replica 124b are both replicas of a same directory (i.e., directory X). At block 330, method 300 modifies the first replica 124a in view of the second replica 124b so that the first replica 124a matches the second replica 124b after an operation was performed on the second replica 124b. Self-healing daemon 120a may modify the first replica 124a in view of the second replica 124b by either overwriting the first replica 124a with the copy of the second replica 124b or performing an incremental update to the first replica 124a so that the first replica 124a matches the second replica 124b. In one implementation, the file index 122b includes an indication of the particular files in directory X which were modified by the operation. Accordingly, self-healing daemon 120a can modify only the actual files in the first replica 124a which have been modified, rather than having to compare each file in the first replica 124a to each file in the second replica 124b to determine which files are to be updated.

Figure 4:
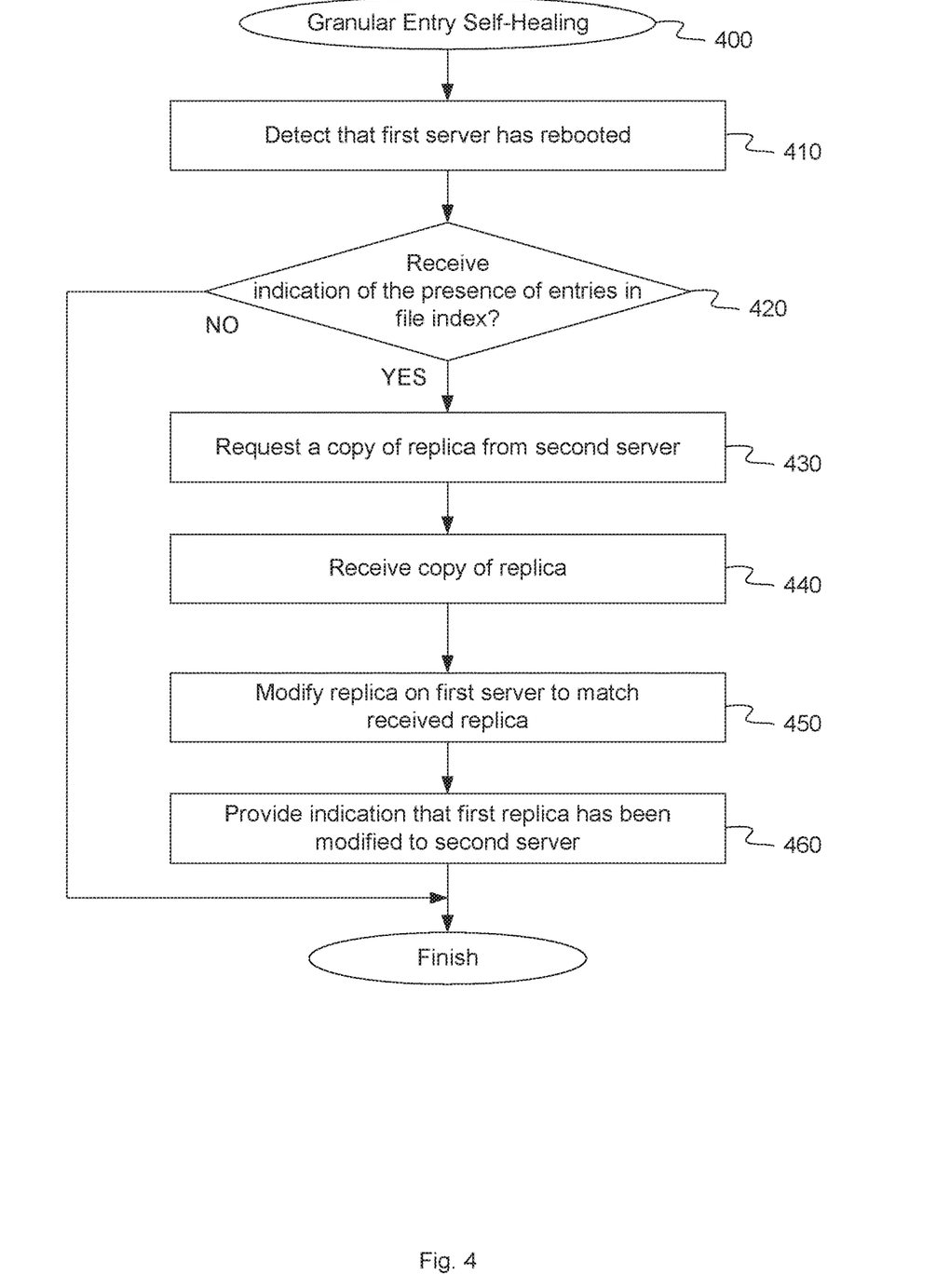
FIG. 4 is a flow diagram illustrating a method for granular entry self-healing in a distributed file system.

FIG. 4 is a flow diagram illustrating a method for granular entry self-healing in a distributed file system. The method 400 may be performed by processing logic that comprises hardware (e.g., circuitry, dedicated logic, programmable logic, microcode, etc.), software (e.g., instructions run on a processing device to perform hardware simulation), firmware, or a combination thereof. The method 400 can restore a directory replica on a storage server which was out of service for a period of time and did not receive updates to the directory performed during that period of time. In one example, method 400 may be self-healing daemon 120a-b, as shown in FIG. 1A.

Referring to FIG. 4, at block 410, method 400 detects that a first server 110a has rebooted after being out of service for a period of time. Since the first server 110a has been out of service, it is possible that one or more of the replicas 124a, 126a maintained by the first server 110a are out of date. Self-healing daemon 120a can use the file index 122b on the second server 110b to make this determination. In one implementation, self-healing daemon 120b detects that first server 110a has rebooted when self-healing daemon 120b receives a response to a periodic status request sent to first server 110a.

At block 420, method 400 determines whether an indication of the presence of entries in file index 122b is received. In one implementation, self-healing daemon 120a receives a message from second server 110b indicating that a file index 122b stored on the second server 110b comprises at least one entry corresponding to replicas of a directory in the distributed file system. File index 122b includes entries corresponding to replicas of files that are modified in some fashion. The entries are generally removed from file index 122b when the operation was successfully performed on the corresponding directory replicas. Thus, a presence of a first entry corresponding to the first replica 124a in the file index 122b indicates that at least one other replica (e.g., second replica 124b) of the directory X was modified according to an operation requested by a client device 104 during the period of time when the first server 110a was out of service.

At block 430, responsive to receiving an indication that the file index 122b comprises a first entry corresponding to a first replica 124a stored on the first server 110a, method 400 requests a copy of a second replica 124b stored on the second server 110b, wherein the first replica 124a and the second replica 124b are both replicas of the same directory.

At block 440, method 400 receives the copy of the second replica 124b. In one implementation, first server 110a receives a copy of the entire replica 124b. In another implementation, first server 110a receives only the particular files within replica 124b which where indicated as having been modified in index 122b. At block 450, method 400 modifies the first replica 124a in view of the second replica 124b so that the first replica 124a matches the second replica 124b. Self-healing daemon 120a may modify the first replica 124a in view of the second replica 124b by either overwriting the first replica 124a with the copy of the second replica 124b or performing an incremental update to the first replica 124a so that the first replica 124a matches the second replica 124b. In one implementation, the file index 122b includes an indication of the particular files in directory X which were modified by the operation. Accordingly, self-healing daemon 120a can modify only the actual files in the first replica 124a which have been modified, rather than having to compare each file in the first replica 124a to each file in the second replica 124b to determine which files are to be updated.

At block 460, method 400 provides second server 110b with an indication that the first replica 124a has been modified in view of the second replica 124b. Once that healing is complete, self-healing daemon 120a can notify server 110b that the first replica 124a has been updated so that file self-healing daemon 120b can remove the first entry from file index 122b. Since the file index 122b includes entries corresponding to directory replicas that are currently being operated on or for which an operation was not able to be successfully performed, once the first replica 124a is modified to reflect the changes that result from performing the operation, the corresponding entry can be removed from index 122b.

Figure 5:
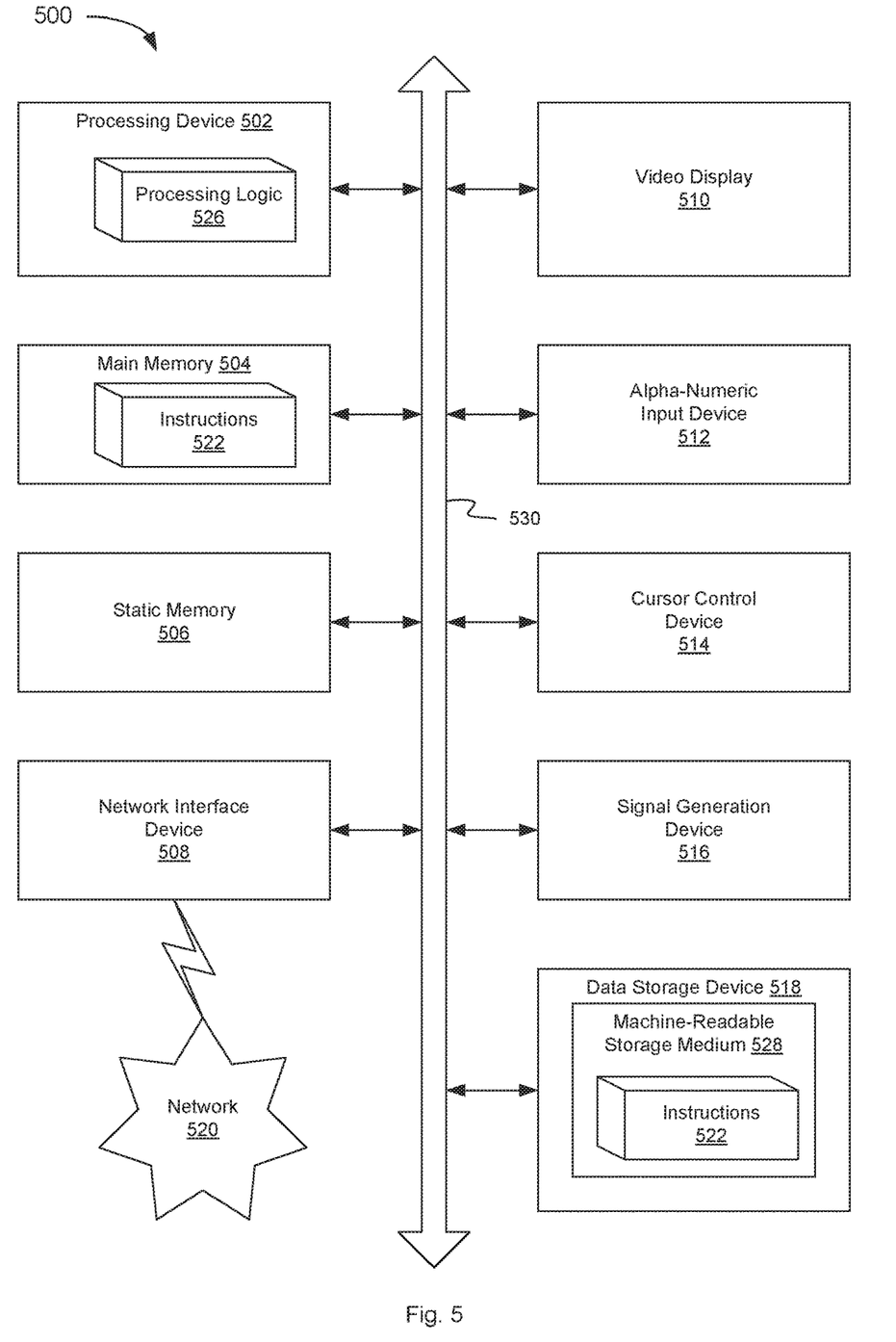
FIG. 5 is a block diagram illustrating one example of a computer system.

FIG. 5 illustrates a diagrammatic representation of a machine in the example form of a computer system 500 within which a set of instructions, for causing the machine to perform any one or more of the methodologies discussed herein, may be executed. In alternative examples, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one example, computer system 500 may be representative of client machine 104 or machines 108a-b, as shown in FIG. 1A.

The example computer system 500 includes a processing device 502, main memory 504 (e.g., read-only memory (ROM), flash memory, dynamic random access memory (DRAM) (such as synchronous DRAM (SDRAM) or Rambus DRAM (RDRAM), etc.), static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses.

Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 executes processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528, on which is stored one or more set of instructions 522 (e.g., software) embodying any one or more of the methodologies of functions described herein. The instructions 522 may also reside, completely or at least partially, within the main memory 504 and/or within the processing device 502 during execution thereof by the computer system 500; the main memory 504 and the processing device 502 also constituting machine-accessible storage media. The instructions 522 may further be transmitted or received over a network 520 via the network interface device 508.

The machine-readable storage medium 528 may also be used to store instructions to perform operations associated with granular entry self-healing, as described herein. While the machine-readable storage medium 528 is shown in one example to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that a certain operation may be performed, at least in part, concurrently with other operations. In another example, instructions or sub-operations of distinct operations may be in an intermittent and/or alternating manner.

Some portions of the preceding detailed descriptions have been presented in terms of symbolic representations of operations on data bits within a computer memory. These descriptions and representations are the ways used in data processing to most effectively convey the substance of their work to others. The operations are those involving physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, discussions utilizing terms such as "identifying" or "locating" or "determining" or "self-healing" or "examining" or "comparing" or "acquiring" or "providing" or "receiving" or "updating" or "setting" or "removing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The operations presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. In addition, a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A snapshot-less method for performing file operations in a distributed file system (DFS), the method comprising:
    receiving, by a processing device of a client of the DFS, a file operation request;
    requesting, by the processing device of the client, creation of a plurality of entries, wherein each entry of the plurality of entries is created in a corresponding file index in each of a set of servers in the DFS, the plurality of entries corresponding to replicas of directories and one or more files that are a subject of the file operation, each entry of the plurality of entries in the file index corresponding to a respective replica of the replicas of directories and having a unique identifier associated with the respective replica;
    requesting, by the processing device of the client, performance of the file operation by each server in the set of servers of the DFS;
    receiving, by the processing device of the client, one or more confirmations from the set of servers, each received confirmation corresponding to an indication that the file operation was completed by a corresponding server in the set of servers; and
    responsive to each of the one or more confirmations, sending a request, by the processing device of the client, to a respective server to clear a respective entry from the file index corresponding to a respective confirmation;
    wherein, responsive to a reboot of a first server in the set of servers, a processing device of the first server is to automatically process the file index on that server by performing a corresponding file operation for each entry in the file index, wherein performing the corresponding file operation includes requesting a copy of a file indicated by each entry from a replica in the set of servers.

2. The method of claim 1, wherein the file operation comprises at least one of creating a file, deleting the file, or modifying the file.

3. The method of claim 1, further comprising:
    requesting, by the processing device of the client, that the replicas of the directories and the one or more files are locked prior to performance of the file operation to prevent other operations from modifying the replicas while the file operation is being performed.

4. The method of claim 1, wherein the plurality of entries each comprise an indication that the file operation was attempted to be performed on a corresponding replica on the set of servers.

5. The method of claim 1, further comprising:
    determining, by the processing device of the client, whether a confirmation that the file operation was completed was received within an expected time interval.

6. The method of claim 5, further comprising:
    responsive to failing to receive the confirmation within the expected time interval, requesting, by the processing device of the client, that a corresponding entry be maintained in the file index, wherein the plurality of entries corresponds to replicas of directories stored on the corresponding server that were modified during a period of time when the first server in the set of servers was out of service.

7. The method of claim 1, further comprising:
responsive to receiving the one or more confirmations, requesting, by the processing device of the client, that the replicas of the directories and the one or more files are unlocked.

8. A client device of a distributed file system (DFS), the client device comprising:
a memory; and
a processing device operatively coupled to the memory, the processing device to:
receive a file operation request;
request creation of a plurality of entries, wherein each entry of the plurality of entries is created in a corresponding file index in each of a set of servers in the DFS, the plurality of entries corresponding to replicas of directories and one or more files that are a subject of the file operation, each entry of the plurality of entries in the file index corresponding to a respective replica of the replicas of directories and having a unique identifier associated with the respective replica;
request performance of the file operation by each server in the set of servers of the DFS;
receive one or more confirmations from the set of servers, each received confirmation corresponding to an indication that the file operation was completed by a corresponding server in the set of servers; and
responsive to each of the one or more confirmations, send a request to a respective server to clear a respective entry from the file index corresponding to a respective confirmation;
wherein, responsive to a reboot of a first server in the set of servers, a processing device of the first server is to automatically process the file index on that server by performing a corresponding file operation for each entry in the file index, wherein performing the corresponding file operation includes requesting a copy of a file indicated by each entry from a replica in the set of servers.

9. The client device of claim 8, wherein the file operation comprises at least one of creating a file, deleting the file, or modifying the file.

10. The client device of claim 8, wherein the processing device further to:
request that the replicas of the directories and the one or more files are locked prior to performance of the file operation to prevent other operations from modifying the replicas while the file operation is being performed.

11. The client device of claim 8, wherein the plurality of entries each comprise an indication that the file operation was attempted to be performed on a corresponding replica on the set of servers.

12. The client device of claim 8, wherein the processing device further to:
determine whether a confirmation that the file operation was completed was received within an expected time interval.

13. The client device of claim 12, wherein the processing device further to:
responsive to failing to receive the confirmation within the expected time interval, request that a corresponding entry be maintained in the file index, wherein the plurality of entries corresponds to replicas of directories stored on the corresponding server that were modified during a period of time when the first server in the set of servers was out of service.

14. The client device of claim 8, wherein the processing device further to:
responsive to receiving the one or more confirmations, request that the replicas of the directories and the one or more files are unlocked.

15. A non-transitory machine-readable storage medium storing instructions which, when executed, cause a processing device to perform operations comprising:
receiving, by a client of the DFS, a file operation request;
requesting, by the client, creation of a plurality of entries, wherein each entry of the plurality of entries is created in a corresponding file index in each of a set of servers in the DFS, the plurality of entries corresponding to replicas of directories and one or more files that are a subject of the file operation, each entry of the plurality of entries in the file index corresponding to a respective replica of the replicas of directories and having a unique identifier associated with the respective replica;
requesting, by the client, performance of the file operation by each server in the set of servers of the DFS;
receiving, by the client, one or more confirmations from the set of servers, each received confirmation corresponding to an indication that the file operation was completed by a corresponding server in the set of servers; and
responsive to each of the one or more confirmations, sending a request, by the client, to a respective server to clear a respective entry from the file index corresponding to a respective confirmation;
wherein, responsive to a reboot of a first server in the set of servers, a processing device of the first server is to automatically process the file index on that server by performing a corresponding file operation for each entry in the file index, wherein performing the corresponding file operation includes requesting a copy of a file indicated by each entry from a replica in the set of servers.

16. The non-transitory machine-readable storage of claim 15, wherein the file operation comprises at least one of creating a file, deleting the file, or modifying the file.

17. The non-transitory machine-readable storage of claim 15, the operations further comprising:
requesting, by the processing device of the client, that the replicas of the directories and the one or more files are locked prior to performance of the file operation to prevent other operations from modifying the replicas while the file operation is being performed.

18. The non-transitory machine-readable storage of claim 15, wherein the plurality of entries each comprise an indication that the file operation was attempted to be performed on a corresponding replica on the set of servers.

19. The non-transitory machine-readable storage of claim 15, the operations further comprising:
determining, by the processing device of the client, whether a confirmation that the file operation was completed was received within an expected time interval.

20. The non-transitory machine-readable storage of claim 19, the operations further comprising:
responsive to failing to receive the confirmation within the expected time interval, requesting, by the processing device of the client, that a corresponding entry be maintained in the file index, wherein the plurality of entries corresponds to replicas of directories stored on the corresponding server that were modified during a period of time when the first server in the set of servers was out of service.

\* \* \* \* \*